Figure 1:
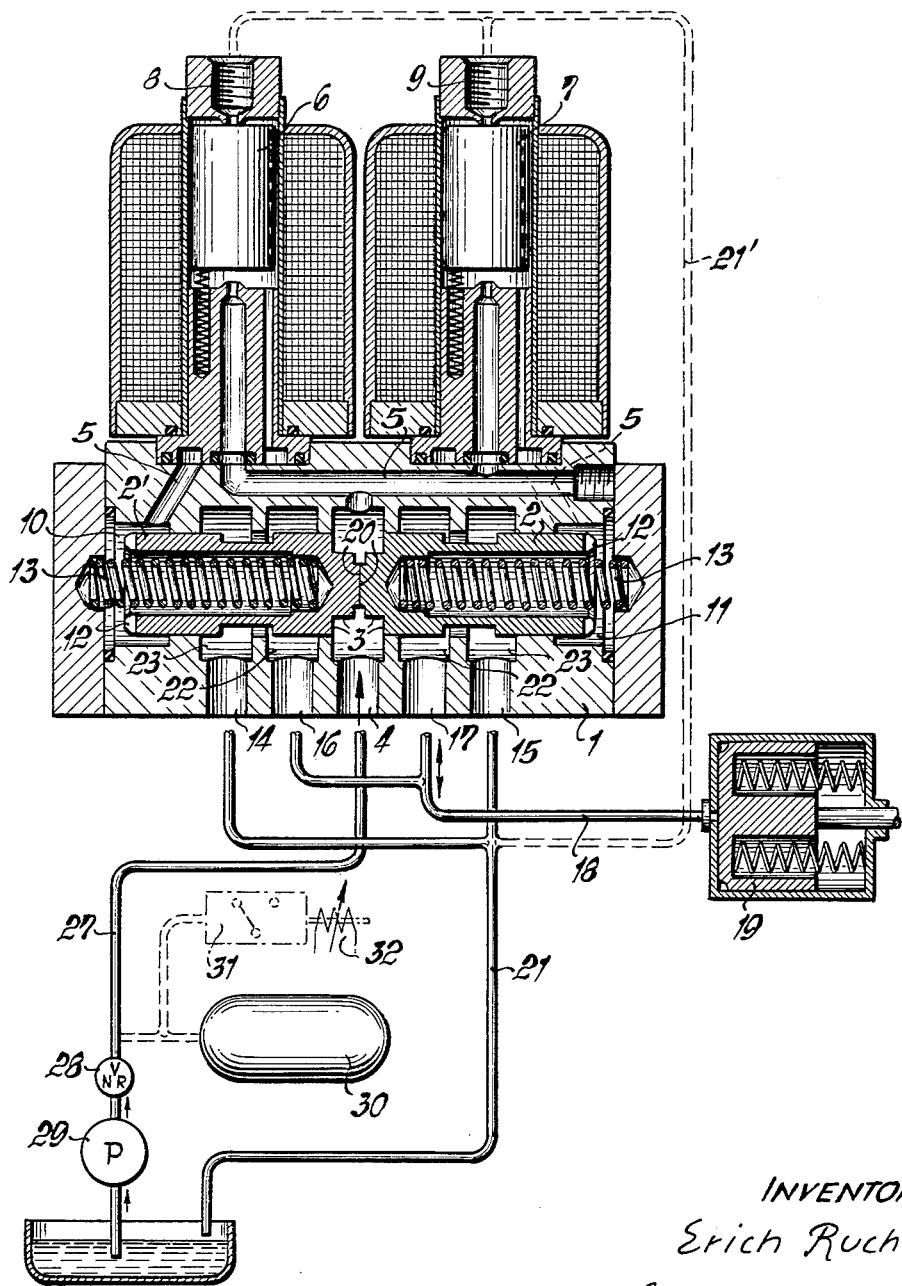

3,243,958
MASTER VALVE UNIT
Erich Ruchser, Rommelshausen, Germany, assignor to Erich Herion, Stuttgart-Frauenkopf, Germany
Filed Feb. 10, 1965, Ser. No. 431,620
Claims priority, application Germany, Feb. 14, 1964, H 51,685
6 Claims. (Cl. 60—51)

The present invention relates to a master valve unit for controlling at least one actuator operable by a pressure medium, particularly an actuator for engaging and disengaging the clutch or brake in the drive means of a press, said master valve unit comprising two separate three-way valves operating in parallel and being controlled by electromagnetically actionable pilot valves to admit the pressure medium to, and to return it from, the controlled actuator.

The primary object of the present invention is to make such a valve unit reliable and foolproof.

According to the invention this is achieved in that the ends of the valve rods have symmetrically opposed faces, that each of the valves is a three-way piston valve so contrived that faulty operation results in either valve being urged to follow the opening shift of the other valve by advancing beyond its normal closing position, and in that the disposition of the ports controlled by the valve pistons as well as the distance of shift of either valve piston into its end position are such that in such a case the outlet cross section from the valve into the return exceeds the entry cross section into the valve.

This arrangement ensures that despite the small entry cross section that remains open in the case of a faulty action, the pressure medium that flows in through this open cross section can immediately flow out again unhindered into the return without affecting the actuator, and that the larger cross section of flow into the return is also sufficient for discharging any pressure medium still in the actuator into the return together with the freshly entering pressure medium.

In the control system of a press or the like the thrust of the restoring spring of the clutch or brake likewise assists in rapidly displacing the pressure medium still in the actuator through the larger open cross section into the return available in the valve without being impeded by the continued flow of further pressure medium through the valve. The master valve unit cannot be effectively operated again until the cause of the fault has been removed.

The distance shift of the two valve pistons together is determined by adjustable stops in the working chambers of the shift pistons of the two valves. This permits the distance within which the entry and return ports are simultaneously open to be correctly preset. Moreover, springs contained in the working chambers of the shift pistons urge the two valve pistons into central position in which the faces of the valve piston heads are in mutual contact. The three-way valve pistons are so disposed that they axially face each other in the midpoint entry chamber and the opposed piston heads are exposed to the entry pressure, the return ports being located on either side of the midpoint pressure entry and the ports to the controlled actuator being between the midpoint pressure entry and the two return ports. This arrangement permits the master valve unit to be made to less precise tolerances of fit because a pressure drop due to a leakage loss and due to sealing deficiencies does not matter when a hydraulic pressure medium is used. Any such leakage loss returns to the sump through the return ports which are farthest away from the midpoint, and the loss is continuously replaced through the midpoint pressure entry. According to another feature of the invention the cross sections of the shift pistons and valve pistons are identical, the differential pressure required for shifting the valve pistons being provided by the reduction in the effective cross section of the valve pistons in the pressure entry chamber when they are in mutual contact.

The entry pressure will therefore act on an effective surface area of the valve pistons that is smaller than the effective shift piston faces.

If one of the pilot valves is faultily activated or its electrical system fails or if any other fault arises in the control system, then the shift piston which is still pressurised through the open pilot valve will displace both valve pistons into their opposite limit positions, this being the "fail" position of the unit. In this position communication is established between entry and return, and pressure medium that still continues to enter the valve can immediately move again into the return, whereas at the same time, although the entry port is partially open, the controlled actuator can likewise discharge the pressure medium it contains into the return, assisted by the thrust of the restoring spring of the clutch or the brake.

Figure 2:
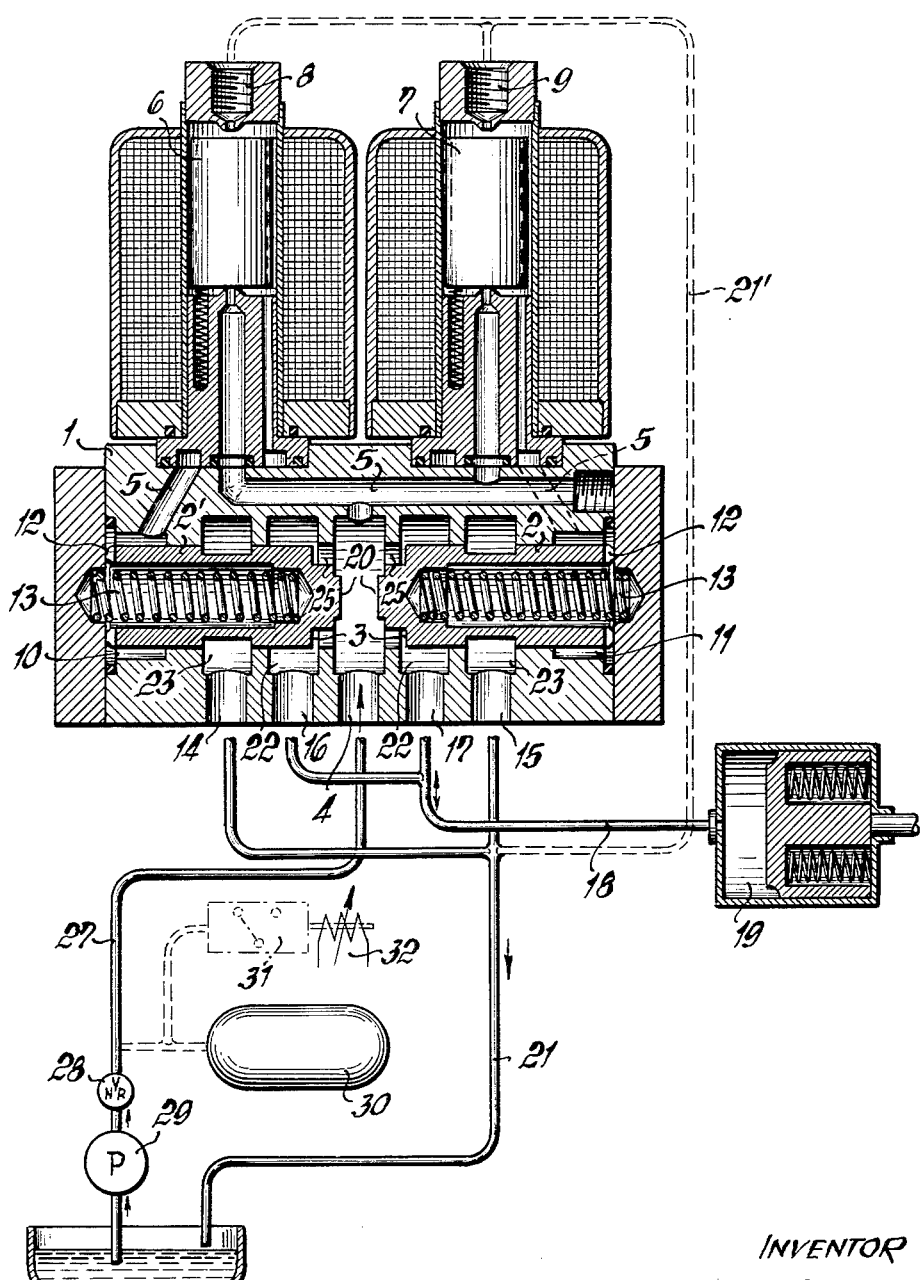
Figure 3:
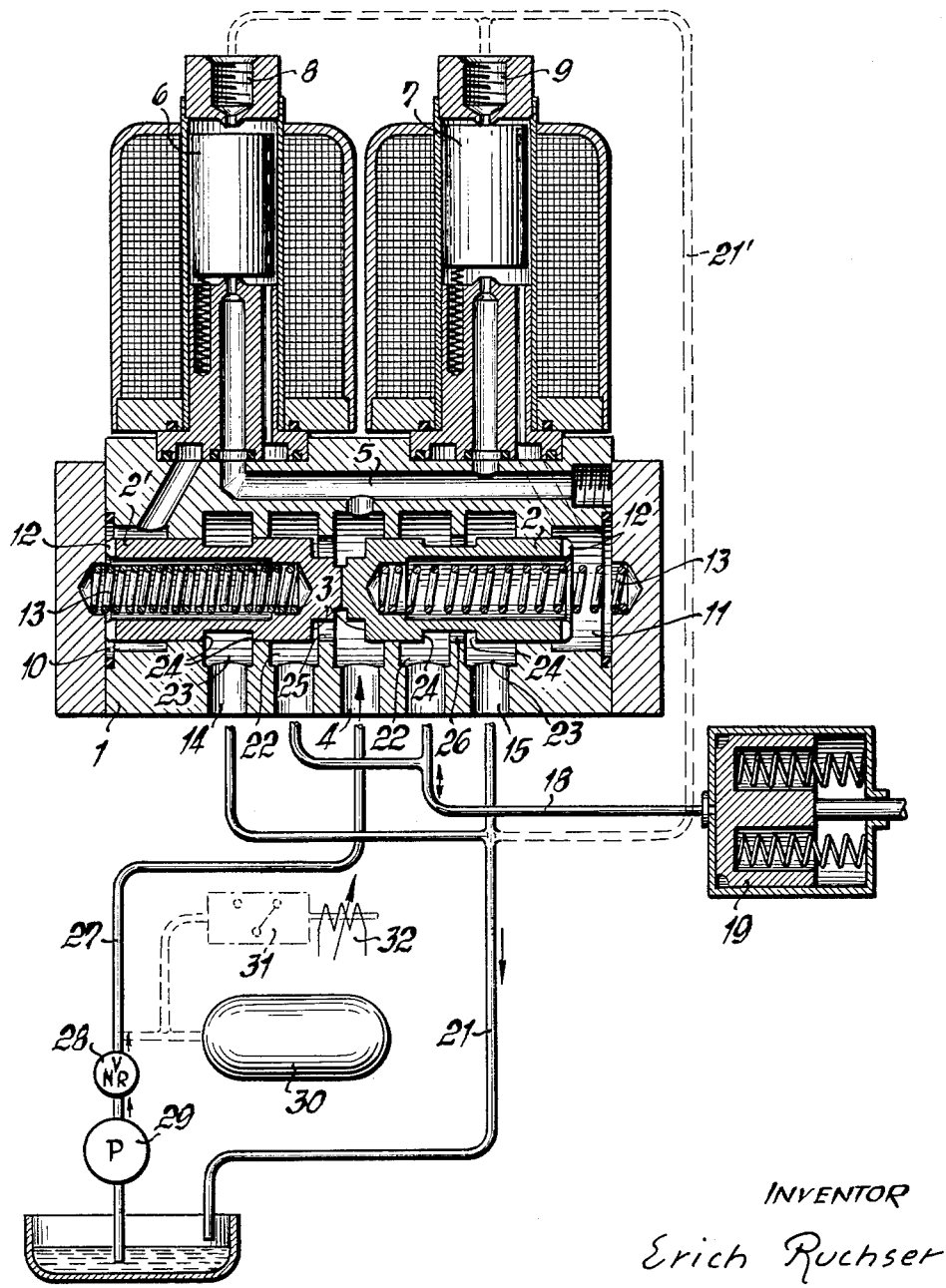

The manner in which a master unit according to the invention can be contrived is illustratively shown in the accompanying drawings which show all the parts necessary for an understanding of the invention. In the drawings FIG. 1 is an embodiment of the master valve unit in closed position, shown in section, FIG. 2 is the same embodiment of the master valve unit in open position, likewise in section, whereas FIG. 3 illustrates the "fail" position of the master valve unit when a fault in the system arises.

The embodiment exemplified in the drawings is a master control unit comprising twin piston valves and two pilot valves for initiating a shift of the two piston valves. This master unit is suitable for instance for controlling the clutch in the drive means of a press. A similar master unit may be provided for operating the brake of the press and both units may be simultaneously activated and inactivated by double trip contacts not shown in the drawing.

A valve block 1 contains two piston valves 2 and 2' which are separately or jointly axially shiftable. The ends of the valve pistons are formed with reduced heads with contacting faces 20. They extend into a central chamber containing the pressure entry. A supplementary duct 5 provides communication between the pressure entry and each of the two electromagnetically operable pilot valves 6 and 7 as well as the two chambers 10 and 11 receiving the shift pistons 12 of the two valve pistons. When the pilot valves are operated they open their outlet ports 8 and 9 which communicate with return pipe 21' and thus relieve the pressure in the chambers 10 and 11, as will be readily understood by reference to FIG. 2 which shows the pilot valves in this position. If the pressure medium is compressed air, special return pipes 21' and 21 are unnecessary.

The generation of the differential thrust required for shifting the valve pistons is due to the presence of the two faces 20 which in the initial position of the valve pistons shown in FIG. 1 reduce the surface area exposed to the entry pressure so that a build up of pressure in the chambers containing pistons 12 will keep the valve pistons in closing position.

The cross sections of the valve pistons 2, 2' are identical with those of the shift pistons 12. Operation of the pilot valves 6 and 7, as shown in FIG. 2, causes the pressure in the chambers of the two shift pistons 12 to collapse and the main valve pistons 2 and 2' to separate. The connections 16 and 17 to the actuator open and are caused to communicate with the pressure entry 4. At the same time springs 13 which bear against the shift pistons are compressed. The purpose of these springs is to urge the two master valve pistons into the central position they occupy in FIG. 1 with their faces 20 in contact when there is no pressure in the system at all.

The transmission of pressure through pipe 18 in the position according to FIG. 2 causes actuator 19 to operate and to move say the clutch or the brake of a press into and out of engagement respectively, whereas according to FIG. 1 the pressure is released through the ports 14 and 15 into the return pipe 21. The several fixed ports 22 and 23 in the valve block and the shift of the controlling edges 24 of the valve pistons 2 and 2' are so devised that faulty operation, as shown in FIG. 3, will always leave a smaller cross section of flow 25 from the pressure entry in the direction towards the return connections 15 or 14 and a larger cross section of flow as at 26 into the returns. Consequently, pressure medium continues to circulate at a reduced rate, but the pressure is at once relieved into the return at 15. At the same time any pressure in the actuator 19 will also be relieved into the return at 15 because the greater cross section of flow at 26 prevents a fresh build up of pressure in the actuator 19.

Moreover, the pressure of the restoring spring in the actuator of a press assists in accelerating the discharge of pressure medium from the actuator into the return at 15. This ensures that immediately a failure occurs and the two valve pistons 2 and 2' assume a position, such as that shown in FIG. 3, the actuator will quite automatically be relieved of the system pressure entering at 4.

If the master unit forms part of a system in which a liquid or gaseous medium is supplied to the pressure entry 4 through a pipe 27 containing a check valve 28 and a pump 29 with the interposition of an accumulator at 30, a faulty operation, as shown in FIG. 3, when the accumulator 30 is charged to the full system pressure, would first possibly lead to the closure of check valve 28 and to a pressure drop in the accumulator 30 due to the ensuing unloading action through the pressure entry into the return 15. However, such a pressure drop can be prevented by the provision of a pressure-responsive switch 31 in the accumulator 30 or in its connection to the main supply pipe 27, the switch being arranged to respond to a given pressure drop and to rupture the main power supply or to close the main pressure supply pipe of the system or to trigger a warning device. The pressure-responsive switch 31 may be adjustable to respond to any desired pressure drop in accumulator 31 by setting means 32.

The heads of the valve pistons 2 and 2' forming the faces 20 may likewise be arranged to project by an adjustable amount in order to vary the relative distance within which the flow sections at 25 and 26 are simultaneously open. Such an adjustment may be desirable for different system pressures or for different kinds of pressure medium.

I claim:
1. In a master valve unit for controlling at least one actuator operable by a pressure medium, particularly for engaging and disengaging a clutch or brake in a drive means of a press, comprising two separate three-way valves operating in parallel and being controllable by electromagnetically actionable pilot valves, the improvement comprising providing that ends of valve rods of said three-way valves have symmetrically opposed faces, that the movable element of each of said first mentioned valves is a three-way valve piston so contrived that faulty operation results in either valve piston being urged to follow the opening shift of the other valve piston by advancing beyond its normal closing position, and that the disposition of the ports controlled by the valve pistons as well as the distance of shift of either valve piston into its end position are such that in such a case an outlet cross-section from the valve into exhaust exceeds an entry cross-section into the valve.

2. In a master unit as in claim 1, the improvement consisting in that the distance of shift of the two valve pistons together is determined by adjusting means provided in working chambers of shift pistons associated with each of the valves.

3. In a master unit as in claim 2, the improvement consisting in that springs contained in the working chambers of the shift pistons urge the two valve pistons into a central position in which faces of the valve piston heads are in mutual contact.

4. In a master unit as claimed in claim 3, the improvement consisting in that the three-way valve pistons axially face each other, that the opposed piston heads are exposed to the midpoint entry pressure and that the return ports are located on either side of the midpoint pressure entry and the ports to the controlled actuator between the midpoint pressure entry and to two return ports.

5. In a master unit as claimed in claim 4, the improvement consisting in that the cross-sections of the valve pistons and the cross-sections of the shift pistons are identical, so that the pressure acting on the open valves are balanced, whereas the differential thrust required for shifting both valve pistons is due to the reduction in effective cross-section due to the heads of the two valve pistons being in mutual contact.

6. In a master unit as claimed in claim 5, comprising an accumulator pressurised through a check valve on the pressure entry side of the control unit, the improvement consisting in that the pressure drop in the accumulator caused by a small entry cross section remaining open when valve operation is faulty is used to operate an adjustable pressure-responsive switch which stops the supply of pressure medium, or cuts the electrical mains supply or activates a warning device.

References Cited by the Examiner

UNITED STATES PATENTS

| | | | |
|---|---|---|---|
| 1,608,277 | 11/1926 | Guernsey | 91—459 X |
| 2,948,262 | 8/1960 | Gratzmuller | 60—51 X |

FOREIGN PATENTS 864,361    4/1961    Great Britain.

EDGAR W. GEOGHEGAN, *Primary Examiner.*